(No Model.)

G. WESTINGHOUSE, Jr. & C. F. SCOTT.
CONVERTER SYSTEM FOR ELECTRIC RAILWAYS.

No. 520,975.          Patented June 5, 1894.

WITNESSES:
Geo. Brown Jr.
Hubert L. Tener.

INVENTORS:
Geo. Westinghouse Jr. and C. F. Scott
BY
Terry & MacKay
ATTORNEYS

THE NATIONAL LITHOGRAPHING COMPANY,
WASHINGTON, D. C.

UNITED STATES PATENT OFFICE.

GEORGE WESTINGHOUSE, JR., AND CHARLES F. SCOTT, OF PITTSBURG, PENNSYLVANIA.

CONVERTER SYSTEM FOR ELECTRIC RAILWAYS.

SPECIFICATION forming part of Letters Patent No. 520,975, dated June 5, 1894.

Application filed July 31, 1893. Serial No. 482,028. (No model.)

*To all whom it may concern:*

Be it known that we, GEORGE WESTINGHOUSE, Jr., and CHARLES F. SCOTT, citizens of the United States, both residing in the city of Pittsburg, in the county of Allegheny, State of Pennsylvania, have invented a new and useful Improvement in Potential-Controllers for Electric-Railway Systems, of which the following is a specification.

Our invention has relation to improvements in the general type of electric railways set forth in patent to George Westinghouse, Jr., No. 404,139, dated May 28, 1889, wherein an alternating current of high potential is generated at the power station and conveyed to properly placed converters wherein the potential of this current is reduced and the secondary circuits are employed for driving motors upon the cars.

Our present invention is particularly designed for use with that modification of the above-described system wherein the motor on the car is fed from sectional working conductors in circuit with the secondaries of the converters, each section having its own separate converter or converters.

The object of our invention is the provision of means whereby the sectional conductors, when not employed in feeding the car motors, may be supplied with an extremely low potential, and whereby, when said motors are being fed from any given section of working conductor, the potential supplied thereto may be raised greatly above that supplied when the conductors are not active. By these means the leakage under normal circumstances is greatly reduced, and particularly in those cases wherein the return is through the rails or the earth.

Another object of our invention is the provision of means whereby the iron losses in the converters used as above may be reduced to a minimum.

Our invention is illustrated in the accompanying drawings, in which—

Figure 1:
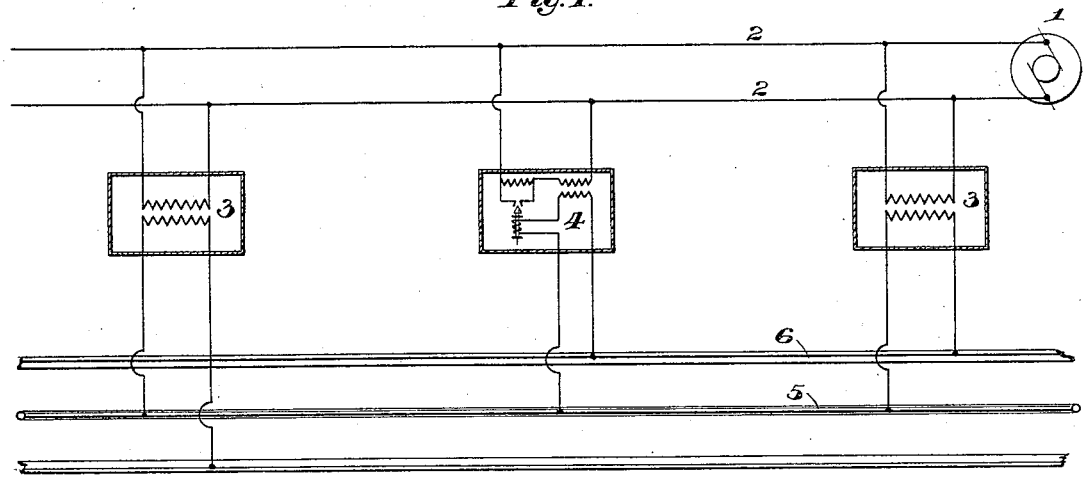
Figure 2:
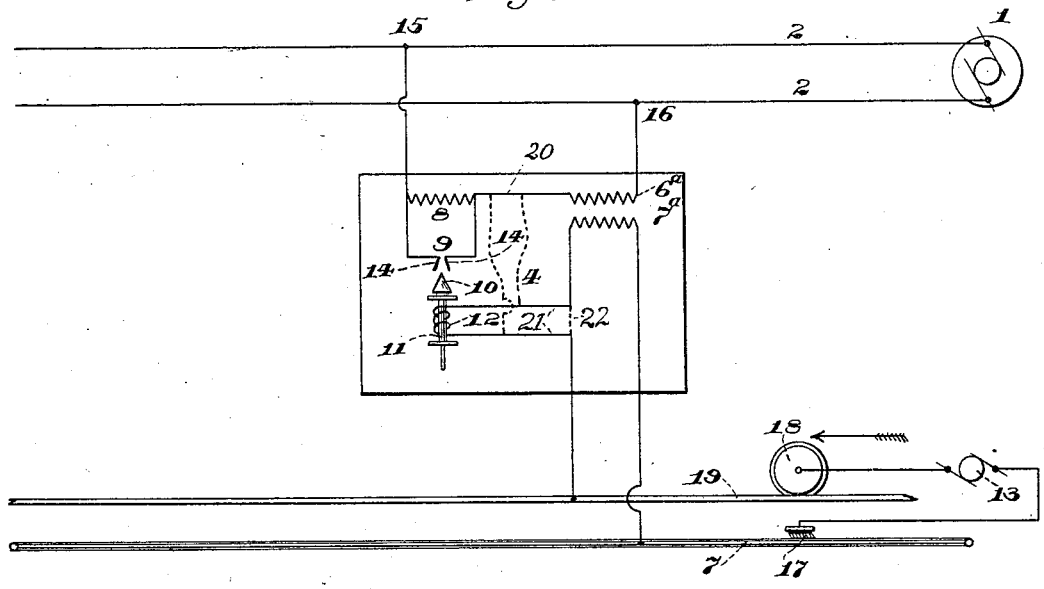

Figure 1 illustrates in diagram the general arrangement of apparatus in our improved railway, one of the converter boxes being shown as provided with our invention, the other converters being shown as heretofore used; and Fig. 2 is a diagrammatic view showing the rail and the working conductor in side elevation and the details of our converter arrangement on a larger scale than Fig. 1.

In the figures, 1 represents an alternating current generator and 2 the primary line carrying a high potential current generated thereby. This high potential current feeds a number of converters which are shown in Fig. 1, and are diagrammatically illustrated at 3 and 4. The form shown at 4 is arranged in accordance with our invention and is shown on a larger scale in Fig. 2. As indicated in both of these figures, the ends of the secondary coils are respectively connected to the supply conductor and the return. It is, of course understood that the conductor 5 may be a surface conductor, or may be placed in any desired relation to the ground and the tracks. One or both rails may be used for the return as shown, but of course our invention is not limited to a system wherein the rails are used for a return circuit, but is equally adapted to an all wire circuit.

In the forms of alternating current railway systems hitherto proposed, much difficulty has been found from the leakage due to the considerable potential necessarily present in the secondary circuit for running the motors. This trouble is particularly detrimental in cases where the supply conductor is placed underground. It is the object of our invention to lessen this difficulty by reducing the potential on the secondary conductors when not in use. Furthermore the losses in the converter iron due to permanent magnetizing current are a considerable item, and our invention is calculated to minimize these losses.

At $6^a$ in Fig. 2 is shown the primary of the converter $6^a$—$7^a$, from the secondary of which the section 7 of supply conductor is fed. Of course any number of converters might be used with each section, nor is our invention confined to the use of converters with sectional conductors. In series with the primary $6^a$ we place a current resisting device such as an ohmic resistance, or preferably a choking coil 8 around which an interrupted short-circuit 9 is provided adapted to co-operate with the movable short-circuiting device 10 to entirely short-circuit the choking coil 8. The short-circuiting device 10 is attached to a magnetic core 11, surrounded by a coil 12 in series with a secondary of the converter 6ª—7ª, and therefore in series with the motor 13 on the car. The core 11 is arranged so as to be normally depressed and out of contact with the short-circuiting springs or contacts 14. Any form of bridging device may be used in this connection, or indeed any circuit-closing apparatus actuated by the increase of electric current through a coil of the converter would naturally be the equivalent of what is shown in Fig. 2.

Supposing a potential of, say, one thousand volts to be present between the terminals 15, 16, when the trolley 17 is not in contact with the section 7 of the working conductor, the secondary circuit of the converter 6ª—7ª will be open and there will be a considerable counter electromotive force opposed by the two coils 6ª and 8. Under proper conditions this counter electromotive force will be practically equal to a thousand volts applied electromotive force, and the current that passes through this branch of the circuit will be but small. These thousand volts will be divided between the coil 6ª and the coil 8, and for the sake of illustration we will assume that each will offer a counter electromotive force of five hundred volts. It is thus evident that a current due to only five hundred volts will pass through the coil 6ª instead of a current due to one thousand volts. The consequence will be that the potential in the secondary will be reduced to one half of what it would be if the coil 8 were absent. This being true, the disadvantage of leakage will be very greatly diminished and there will be less danger of accidental shocks to persons and animals in the streets. This is particularly advantageous where the conductor 7 is placed underground.

A further advantage of the use of the coil 8 is that the converter 6ª—7ª will take a smaller current during the time that its secondary is open, and thus there will be less loss due to permanent magnetization of the iron of the converter. By making the choking coil 8 comparatively small, the loss in this choking coil will not materially counteract this gain in the converter. Upon the entrance of the car on the section connected with the converter shown in Fig. 2 and the contact of the wheel 18 with the rail 19 and the trolley 17 with the section of conductor 7, the secondary circuit will be closed through the motor and if the low electromotive force of the secondary under the conditions above described were all that was available, the motor would not be capable of driving the car.

In order to raise the electromotive force to a proper degree to actuate the motor on the car, the short-circuiting device 10 is employed. As soon as the car enters upon the section, a small current is set up through the secondary circuit of the converter. This current, by means of a coil 12, raises the core 11 and puts the points 14 into electrical connection with one another by means of the bridging piece 10. The choking coil 8 being thus cut out of the circuit, the whole thousand volts is thrown upon the primary of the converter, and the secondary current immediately rises to a proper working strength. It is evident that as the car is running and the current collecting device passes from one section of conductor to another momentarily bridging the same, the coil 12 will receive not only the current due to the converter secondary on its own section, but also a portion of the current under high potential from the section which the car is leaving. As it is necessary that cars should be able to start on a section from rest, however, the current from the secondary when at low potential should be of itself sufficient to actuate the short-circuiting device upon closing the circuit through the motor on the car. If desired, the coil 12 may be put into the primary circuit, for instance, as shown in dotted lines in Fig. 2. In this case the portion 20 of the primary circuit will be omitted and the portions 21 of the secondary circuit will be also omitted, the secondary circuit being completed by means of the dotted connection 22. It will then be actuated by the extra current passing through the primary due to closure of the secondary. In either case, the short-circuiting device is actuated by increase of current due to closing the work circuit through the car motors.

While we prefer the use of a choking coil 8 in the connection above shown, it will be evident that the principle of our invention involves the use merely of any device for resisting the flow of current, and we do not wish to be limited to a choking coil alone in this connection.

The nature of the motor on the car, the relation of the working circuits to the generator, the position of the supply conductor and its relation to the earth or another conductor as a return, are all details variable by one skilled in the art. It is also evident that our invention is not necessarily confined to electric railways, but is useful wherever the electrical conditions require normally low and occasionally high secondary voltage.

What we claim is—

1. In a system of electrical distribution, a working conductor, an alternating current generator and main line fed therefrom; in combination with one or more converters, the primaries of which are fed by said main line and the secondaries of which are connected to said working conductor, means for resisting flow of current in series with the primaries of said converter or converters, and means actuated by the increase of current due to closing the secondary circuit through the car motors for short-circuiting said current resisting means, substantially as described.

2. In an electric railway, a working conductor, an alternating current generator and main line fed therefrom, and a converter for the working conductor, the primary of which is fed by said main line and the secondary of which is connected to said working conductor; in combination with means for resisting flow of current in series with the primary of said converter and means actuated by the increase of current due to closing the secondary circuit through the car motors for short-circuiting said current resisting means.

3. In an electric railway, a sectional working conductor, an alternating current generator and main line fed therefrom, and a converter for each section of the working conductor, the primary of which is fed by said main line and the secondary of which is connected to said working conductor; in combination with means for resisting flow of current in series with the primary of said converter, and means actuated by the increase of current due to closing the secondary circuit through the car motors for short-circuiting said current resisting means, substantially as described.

4. In an electric railway, a sectional working conductor, an alternating current generator and main line fed therefrom, and a converter for each section of the working conductor, the primary of which is fed by said main line and the secondary of which is connected to said working conductor; in combination with means for resisting flow of current in series with the primary of said converter, and means actuated by the secondary current for short-circuiting said current resisting means, substantially as described.

5. In an electric railway, an alternating current generator, a main line fed thereby, a sectional working conductor and a converter having its primary fed from said main conductor and its secondary feeding said working conductor, in combination with means for resisting flow of current in series with the primary of said converter, an interrupted short-circuit in shunt around said means, a movable core carrying a bridging piece for closing said short-circuit, and a coil in series with the secondary of said converter for actuating said movable core, substantially as described.

6. In an electric railway system, an alternating current generator, a main line fed thereby, a sectional working conductor, a converter for each section of said working conductor having its primary fed from said main line and its secondary feeding said section of the working conductor, in combination with a choke coil in series with the primary of said converter, an interrupted short-circuit around the choke coil, a movable magnetic core carrying a bridging piece for closing said short-circuit and a coil in series with the secondary of said converter for actuating said core, substantially as described.

In testimony whereof we have hereunto subscribed our names this 21st day of July, A. D. 1893.

GEO. WESTINGHOUSE, Jr.
CHAS. F. SCOTT.

Witnesses:
JAMES WM. SMITH,
HUBERT C. TENER.